J. ADAIR.
Lamp.
No. 1,548. Reissued Oct. 6, 1863.
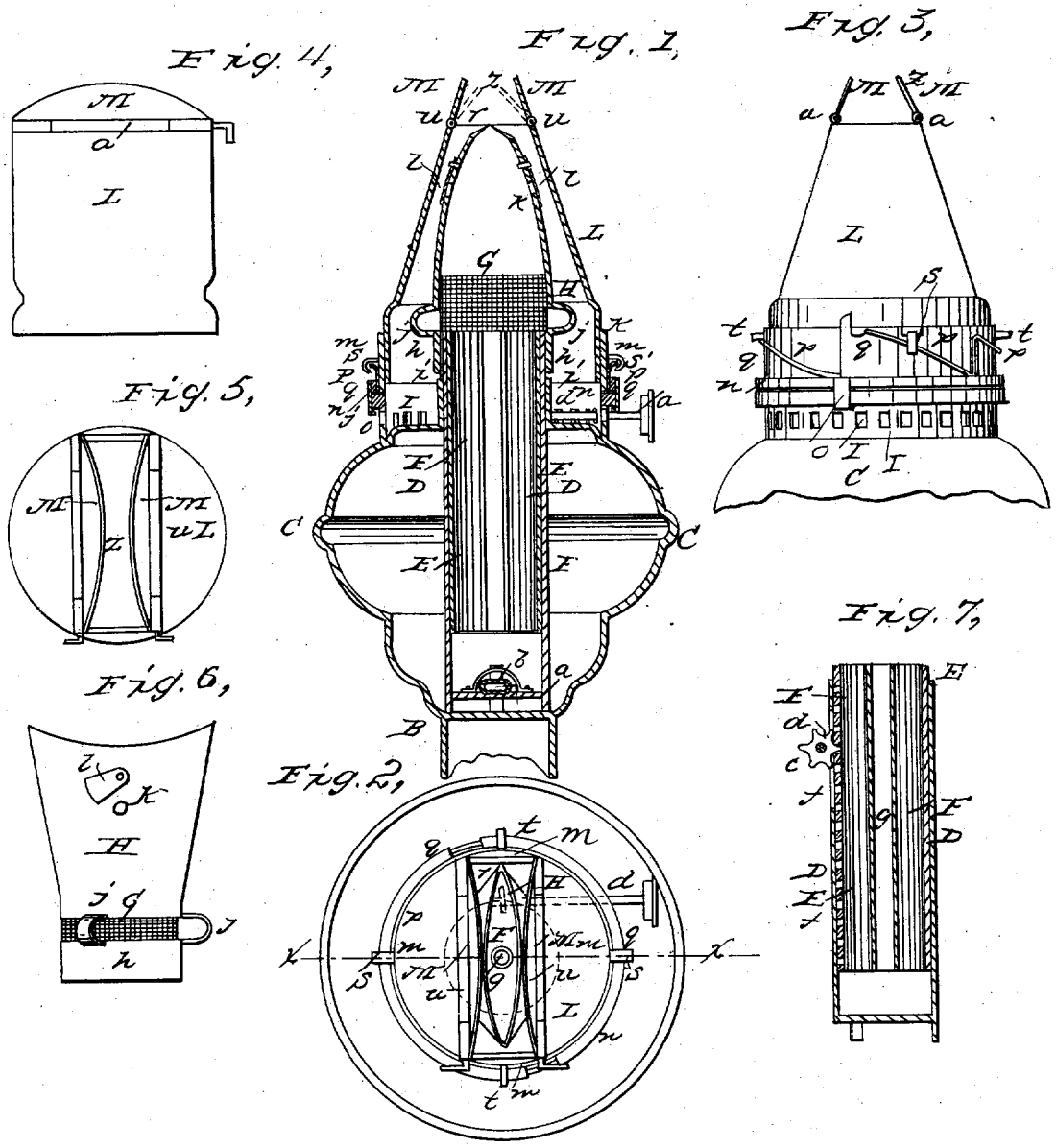
WITNESSES:
W. F. Campbell
E. Schaffer
INVENTOR:
James Adair
by his Attys
Mason Fenwick & Lawrence
N. PETERS, Photo-Lithographer, Washington, D. C.

UNITED STATES PATENT OFFICE.

JAMES ADAIR, OF PITTSBURG, PENNSYLVANIA.

IMPROVEMENT IN LAMPS.

Specification forming part of Letters Patent No. 29,347, dated July 31, 1860; Reissue No. 1,548, dated October 6, 1863.

*To all whom it may concern:*

Be it known that I, JAMES ADAIR, of Pittsburg, in the county of Allegheny and State of Pennsylvania, have invented a new and Improved Lamp; and I do hereby declare that the following is a full, clear, and exact description thereof, reference being had to the accompanying drawings, making a part of this specification, in which—

Figure 1 is a vertical central section of my invention, taken in the line *x x*, Fig. 2. Fig. 2 is a plan or top view of Fig. 1. Fig. 3 is a side elevation of the upper portion of the lamp, showing the adjustable hood applied to the same. Fig. 4 is a detached elevation of the hood. Fig. 5 is a top view of the same. Fig. 6 is a side elevation of the tube or burner which immediately surrounds the flame, and which is between the latter and the sides of the hood. Fig. 7 is a vertical diametrical section through the wick-tubes and the tube inclosing the same, showing the manner of adjusting the wick-tube.

Similar letters of reference indicate corresponding parts in the several figures.

The object of this invention is to obtain a lamp by which volatile hydrocarbon oils may be successfully burned for illuminating purposes without a chimney.

The invention is more especially designed for burning coal-oils, those of the heavier grades, which have not hitherto been successfully burned without a chimney, and which cannot well be burned with a chimney when capillary attraction is chiefly depended on for supplying the oil to the flame.

To enable others skilled in the art to make and use my invention, I will proceed to describe its construction and operation.

B represents a portion of the pedestal, and C is the body or fountain of a lamp, both of which may be of the usual construction, and therefore do not require a minute description.

D is a tube, which is placed centrally within the body or fountain C. This tube D extends from the bottom of fountain C to a point which is a short distance above its top, as shown in Fig. 1. Inside of the tube D, just above its bottom, there is secured a disk, *a*, in which a valve, *b*, is placed, opening upward. The portion of the tube below the disk *a* is perforated to admit the contents of the fountain to the valve *b*. In the upper part of the tube D a slot or opening is made, in which a pinion, *c*, is fitted and allowed to rotate, said pinion being on a shaft, *d*, which is placed in suitable bearings at the upper part of the fountain. This shaft *d* may be fitted in shifting bearings to admit of the pinion being moved out from the tube D at any time when required, in order to admit of the tube D being readily removed from and fitted in the fountain. A hole, *e*, is made in the top of the fountain to allow the pinion to work therein, and also to admit of the fountain being filled or supplied with the necessary burning material.

F is a tube, which is a little shorter than the tube D and a trifle smaller in diameter, so that the former may fit into and freely slide up and down within the latter. The tube E has a series of holes made through it in a vertical line, to form a rack, *f*, with which the pinion *c* engages, as shown in Fig. 7. The tube E receives the wick F, which may be composed of a roll of canton-flannel, the fabric being wound around a tube, *g*, of small diameter, extending the whole length of the tube E.

G is a wire-gauze open thimble, which is fitted on the upper end of the tube D. This thimble has a ring or band, *h*, on its lower part, which rests on a flange, *i*, on the lower part of the thimble, and to the ring *h*, curved strips, *j* are attached at equal distances apart. The strips *j* support a tube, H, the lower end of which is a short distance above the ring *h*. The tube H and ring or band *h* may be made of one piece of metal, and the wire-gauze thimble fills the space between the two parts H and *h*, as shown in Figs. 1 and 6. At a short distance from the top of the tube H there are two holes, *k k*, at opposite points, each hole being provided with a pivoted cover, *l*. The top of the tube H is flattened, so as to form a narrow elliptical orifice, as shown clearly in Fig. 2. The tube at the ends of the opening may extend up a trifle higher than the central portion.

To the upper part of the fountain C a perforated cylinder, I, is secured permanently, and on this cylinder a ring or band, J, is placed and permanently fastened. The upper part of the cylinder I, has four vertical slots, *m*, made in it at equal distances apart. On the cylinder I a cylinder, K, is placed.

This cylinder K has a ring, *n*, attached to its lower end, said ring resting on ring J, and having clamps *o*, which fit over the latter ring. The cylinder K is allowed to turn freely on cylinder I, and its upper part is so cut as to form four inclined planes or edges, *p*, of equal length, said planes *p* extending down to the ring *n*. The inclined planes, or edges *p* are flanged outward at their upper edges, as shown at *q*, Figs. 1 and 3.

L is a hood or cap, which is cylindrical at its bottom and tapering toward its upper end, as shown in Figs. 1, 3, and 4. To the lower part of this hood or cap L there are attached small hooks S S, at opposite points, and there are also attached (at opposite points) to the lower part of this hood pins *t t*, Figs. 2, 3. These hooks and pins are fitted in the slots *m* of the cylinder I, and the flanges *q* of two of the inclined edges work in the hooks S S of the hood, while the pins *t t* rest on the other two flanges. By turning the cylinder K the hood or cap L is raised or lowered.

On the upper end of the hood, or cap L there are two deflecting lips or plates, M. These lips or plates are attached by joints or hinges *u* to the hood or cap, so that they may be adjusted and their edges set at any required distance apart. When it is not desired to adjust the plates or lips M, or, in other words, when it is desired to construct the hood or cap without this adjustment, the lips M may be formed on the edges of the hood itself by bending over these edges so as to give the desired opening through the top of the cap L. This opening should be made somewhat in the form represented in Figs. 2 and 3, its central part being narrower than its ends, for the purposes hereinafter to be described. Instead of making the openings through the base of the cone or through the neck portion I, these openings may be made higher up or through the cap L at any suitable point or points for admitting air into the cap to supply combustion; and, if desirable, long slots may be cut in the cap L, preserving, however, that portion of the metal which immediately surrounds the flame solid or free from openings, except the opening through which the flame passes, as above described; or the main portion of the cap may be made of wire-gauze.

The manner of operating the lamp is as follows: The hood or cap L is first removed, then the oil is introduced into the lamp through the aperture *e*, or by removing the tube H and the wick-tube E and pouring the oil into the tube D. These tubes H and E are then replaced and the wick F lighted. The holes *k* in the upper part of the tube H are uncovered and a light applied to the top of the tube. After burning a moment the holes *k* are covered and the hood L replaced, depressed, or lowered, and the deflecting-lips M adjusted, if adjustable, to suit the flame—*i. e.*, till the flame gives the best light with no smoke.

The adjustable wick-tube E permits of a greater or less amount of air to be supplied to the top of the wick by diminishing or increasing the distance between it and the tube or burner H, and also aids in condensing the gas, which would otherwise pass off into the room after extinguishing the flame, the wick-tube, it will be remembered, being raised or lowered by turning shaft *d*, in consequence of the pinion *c* gearing into the rack *f*. The tube D serves as a guide or socket for the wick-tube E, and also aids in condensing the unconsumed gas. The disk *a*, containing the valve *b*, is for the same purpose, as also is the small tube *g* in the center of the wick. The slit near the top of the tube D, besides serving the purpose of admitting the pinion *c* to the wick-tube, admits of the oil which rises to condense the gas to pass back again into the fountain C, which operation is as follows: The wick-tube E and its wick F being shorter than the tube D, in which they are placed, when the ends of these two tubes are even at the top there is a space filled with oil between the disk *a* and the bottom of the wick, and the valve *b* is the only opening below. Therefore when the wick is depressed and the valve closed the oil in the above-named space is forced up through the tube *g* in the middle of the wick, overflows at the top, condenses the gas, and passes back into the lamp through the slit in the upper part of the tube D, as above described. The burner H, in connection with the wire-gauze thimble G, restrains the admission of air to the wick, thereby causing imperfect combustion, and conveying the gas not consumed there some distance above, in order to supply it with air, which is heated and caused to ascend by the heat from the top of the wick. The three supporters *j* of the burner H are made convex, in order to admit air to that part of the thimble hidden or covered by them. The thimble is made detachable from the burner H, so that when it burns out its place can be supplied by a new one. The holes *k k* in the upper part of the burner H aid in heating the burner immediately after lighting the wick. The tube being cold, some of the first gas ascending is condensed, and to stop this as soon as possible the holes *k* are uncovered and the gas lighted, the flame burning inside of the tube between the holes and top, thus heating it rapidly. The holes are then uncovered. The perforations through the cylinder I admit air to the flame, and the cylinder *k*, which turns on it, serves as a means to elevate and depress the hood or cap L to permit the flame to be almost covered when the lamp is carried about, to protect the flame from currents of air impinging upon it outside of the cap. This cap L conducts the air heated below into the flame and against the lips M, and by making these lips adjustable they can be adapted to suit the size of the flame and the amount of carbon it contains—the greater the amount of carbon the smaller the opening required at the top of the cap.

The curving of the edges of the lips M causes a perfect mixture of the gas and air; but the most important office which the opening through the top of the cap L performs is to retard the ascension of the flame, and at same time allow it to spread as much as possible, thus giving it more oxygen and keeping the particles of carbon of the flame in longer contact with the blue flame produced by the hydrogen of the oil and oxygen of the air uniting, and so causing the heat of the carbon to become greater, and making it more disposed to unite with the oxygen of the air; and while this is the case it is necessary to abstract as little heat as possible from the flame by the hood or cap; hence the slot or opening Z is made of the form shown in Figs. 2 and 5, narrow in the center and gradually increasing in width toward the ends. The same effect would be produced by making the opposite edges at the highest point of the cap L parallel, or nearly so, and then making the ends of the slot terminate in elliptical or circular or angular openings of increased size; but I prefer the double-concave opening represented in the drawings, as the flame is more uniformly supplied with air and contracted in width. By using this form of opening I not only retard the ascension of the flame in the center, and thereby intensify the heat and burn up the particles of carbon which would otherwise escape in the form of smoke, but the flame is made very thin in the center by the contracted portions of the lips, and at the same time allowed to spread out laterally on each side of the center, and to receive the heated air which is conducted up from beneath the cap. I am thus enabled to produce a very wide, thin flame and to keep the carbon in an incandescent state.

I do not claim, broadly, the burning, for illuminating purposes, of coal-oil and other volatile hydrocarbons by first decomposing the same by imperfect combustion, the illuminating-flame burning the escaping gas, for this has been previously done; nor do I claim a "flame-spreader" constructed of wire rods, however shaped, as such a device does not increase the draft nor supply the flame with heated air, nor protect the flame from lateral currents of air when the lamp is moved about or when it is still; but What I do claim as new, and desire to secure by Letters Patent, is—

1. Constructing a hood or cap, L, having an orifice through its upper end, in such manner that the flame of the lamp will be contracted in thickness at the center and expanded beyond this point, and so that the ascension thereof will be such as sufficiently to allow the particles of carbon to become so highly heated as to unite rapidly with the oxygen of the air which is supplied beneath said cap, substantially as described.

2. The hood or cap L, provided with air-entrances beneath it, and also with a slot or opening, Z, in its top, having its central part or space narrower than the space at its ends, substantially as described.

3. Making the deflecting and flame-retarding lips of cap L adjustable, substantially as described.

4. The gas tube or burner H, having an elliptical and centrally-depressed orifice, side openings, *k k*, ring or band *h*, and distended connected arms or strips *j j*, substantially as described.

5. The wire-gauze thimble G, arranged within the space in the lower part of the burner, substantially as described.

6. The central wick-tube, *g*, in combination with the valve *b*, adjustable wick-tube E, and the chamber beneath this tube, substantially as described, for the purpose of causing cold oil from the reservoir to flow over the upper part of the wick, as set forth.

7. Condensing the gas evolved after the light is extinguished, and thus preventing this gas from escaping from the lamp, by means substantially as described.

JAMES ADAIR.

Witnesses:

CHARLES A. HOWE,

W. A. ADAIR, Jr.